W. L. HOLLOWAY.
NUT LOCK.
APPLICATION FILED NOV. 20, 1908.
926,867.
Patented July 6, 1909.
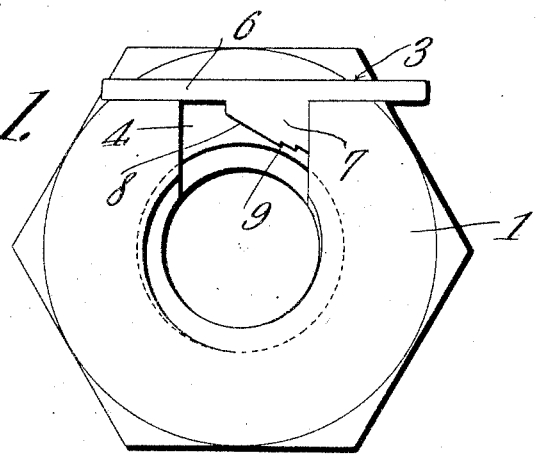
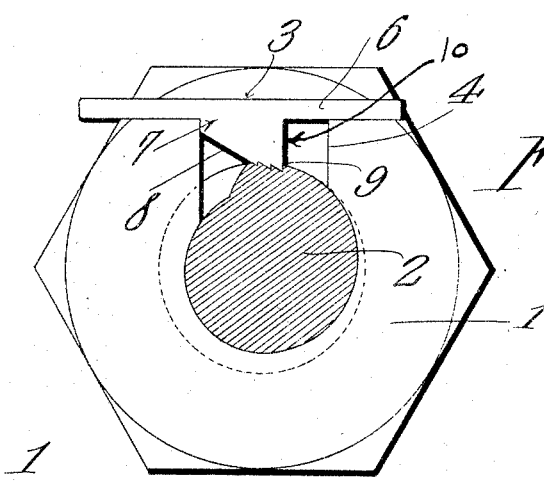
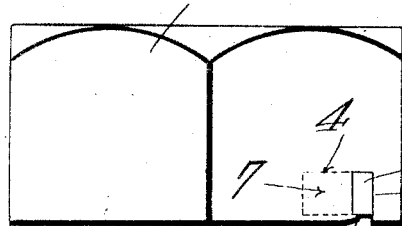
Witnesses
Inventor
Willis L. Holloway.
By C. A. Snow & Co.
Attorneys

UNITED STATES PATENT OFFICE.

WILLIS L. HOLLOWAY, OF BARNESVILLE, OHIO.

NUT-LOCK.

No. 926,867.  Specification of Letters Patent.  Patented July 6, 1909.

Application filed November 20, 1908. Serial No. 463,657.

*To all whom it may concern:*

Be it known that I, WILLIS L. HOLLOWAY, a citizen of the United States, residing at Barnesville, in the county of Belmont and State of Ohio, have invented a new and useful Nut-Lock, of which the following is a specification.

This invention relates to improvements in nut locks and particularly to the type wherein the nut is locked to the bolt with a key.

It has for one of its objects to provide a device of that kind which can be applied to any form of bolt without altering the latter.

Another object is to provide a construction which can be readily locked and unlocked.

A further object is to provide a locking member which will tend to increase the friction between its surface and that of the bolt with any tendency of the nut to turn in one direction.

A further object is to provide a construction in which the locking member will bear tangentially on the threads of the bolt and be at all times combined with the nut.

A further object is to provide a locking member which will operate when moved in one direction positively to lock the nut at any fraction of a turn.

With these and other objects in view, as will more fully hereinafter appear, the present invention consists in certain novel details of construction and arrangement of parts, hereinafter fully described, illustrated in the accompanying drawings, and more particularly pointed out in the appended claim, it being understood that various changes in the form, proportion, size and minor details of the device may be made without departing from the spirit or sacrificing any of the advantages of the invention.

In the accompanying drawings forming a part of this specification:—Figure 1 is an end elevation of a nut provided with my improved locking member, and showing the latter out of locking position. Fig. 2 is a similar view showing a section through a bolt with the locking member moved into locking position with the threads of the latter. Fig. 3 is a side elevation of a nut showing the formation of the recess and manner of securing the locking member therein.

Similar numerals of reference are employed to designate corresponding parts throughout.

The nut 1 and bolt 2 may be of any well known type, and in the lower face of the former is fashioned a transverse recess 3 which is disposed between the outer face of the nut and the wall of the threaded bolt opening. Communication between the recess and the bolt opening is effected by means of a seat 4 extending from the intermediate portion of the recess into the bolt opening.

The form of locking member employed is shown to consist of a single piece of metal, substantially rectangular in cross section. The length of the locking member is considerably greater than that of the recess 3, so that when inserted in the latter, as shown in Figs. 1 and 2, its opposite ends will project beyond the wrench faces of the nut. The width of the locking member is a trifle less than the depth of the recess 3, so that when inserted in the latter it may be loosely secured therein by upsetting or clamping the metal at the edge of one of the walls of the recess inwardly so as to form an overhang or lip 5, which will slightly bear on the outer face or edge of the locking member but not with sufficient force to prevent longitudinal movement of the same in the recess.

The locking member is provided with a lateral lug or dog 7 which projects into and is of less width than the seat 4, in order to permit either end of the locking member to be moved inwardly so as to permit one end to be substantially flush with the wrench faces of the nut. The dog 7 is on its outer side provided with a beveled surface 8 having transverse serrations or teeth 9, the function of which will presently appear. The length of the highest point in the inclined surface 8 is such that when it reaches the middle of the seat 4, as shown in Fig. 2, it will project beyond the edge of the threaded wall of the bolt opening. By referring now to Figs. 1 and 2, it will be seen that the serrations or teeth are so formed on the inclined face 8, that a tendency of the nut to turn in a direction to disengage itself from the bolt, will result in the teeth 9 becoming deeper embedded into the threads of the bolt.

From the foregoing it is obvious that the present construction will operate positively to lock the nut at the smallest fraction of a turn of the latter on the bolt 2. It is held that this is an advantage over similar devices provided with tangential keys, wherein the nut must be turned slightly to the left before the key can be operated to lock. It is to be further observed when the parts are in locked position, as shown in Fig. 2, they may be readily unlocked by tapping that end of the key projecting beyond the face of the nut. Thus it will be seen that the indentations produced by the serrations 9 on the threads of the bolt will have no bad effects upon the latter, such as would render it unfit for further use. The advantage of providing the nut with a key at all times combined therewith is to avoid loss of the key and to maintain the parts in position for instant use.

In devices of the class herein described, when the locking member is moved from an operative into an inoperative position, such movement is apt to take place somewhat violently, the bolt not infrequently holding the locking member under repeated blows, the separation of the locking member and the bolt at length being effected by relatively strong blows, forcing the dog violently into contact with the wall of the seat which contact not only tends to injure the dog, but when the dog moves from an operative into an inoperative position, the same is likely to become wedged, so that, only with great difficulty can it again be moved to operative position. In the nut lock of my invention, the base 10 of the wedge-shaped dog is disposed at right angles to the transverse recess 3, a wall of the seat, disposed at right angles to the recess, being arranged to engage the base of the wedge-shaped dog. By this construction, the defects hereinbefore pointed out as existing in the devices of the class described, are obviated.

What is claimed is:—

A device of the class described comprising a nut provided on its inner face with a recess extending transversely across the nut, and with a seat disposed at right angles to the recess and forming a communication between the recess and the bolt opening of the nut; a locking member of less height than the depth of the recess, and longer than said recess, arranged to be seated in said recess, and provided with a wedge-shaped dog arranged to slide in the seat and serrated on one edge adjacent the bolt opening of the nut, the plane of the base of the wedge of the dog being disposed at right angles to the recess and being engaged by a wall of the seat when the locking member is moved into inoperative position, one of the walls of the recess being upset to retain the locking member against disconnection from the nut.

In testimony that I claim the foregoing as my own, I have hereto affixed my signature in the presence of two witnesses.

WILLIS L. HOLLOWAY.

Witnesses:
 W. O. CHAFFEY,
 DEBORAH WILLIAMS.